United States Patent Office 3,515,725
Patented June 2, 1970

3,515,725

2,3a-DIAZAHYDRINDANONE AND 3H-PYRIDO-[1,2-c]PYRIMIDIN-3-ONE DERIVATIVES

Joseph Hellerbach, Basel, Switzerland, assignor to Hoffmann-La Roche Inc., Nutley, N.J., a corporation of New Jersey No Drawing. Filed Mar. 28, 1967, Ser. No. 626,387
Claims priority, application Switzerland, Apr. 6, 1966, 5,052/66
Int. Cl. C07d *57/20*
U.S. Cl. 260—251 22 Claims

ABSTRACT OF THE DISCLOSURE 2,3a-diazahydrindanone and 3H-pyrido-[1,2-c]pyrimidin-3-one derivatives useful as analgesics, antiphlogistics, anti-allergics and anti-inflammatory agents.

BRIEF SUMMARY OF THE INVENTION

The invention relates to novel heterocyclic compounds of the formula

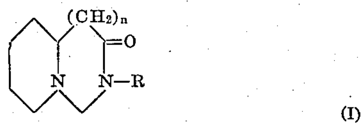

wherein R signifies hydrogen, lower alkyl, lower alkyl bearing one or more substituents selected from the group consisting of hydroxy, halogen, amino, lower alkylamino, di-lower alkylamino and heterocyclic radicals; aryl, aryl bearing one or more substituents selected from the group consisting of halogen, nitro, amino, hydroxy, lower alkyl, lower alkoxy, amino-lower alkyl, mono-lower alkylamino-lower alkyl, di-lower alkylamino-lower alkyl, trifluoromethyl, lower alkoxycarbonyl, lower acyl and lower alkanoylamido; aralkyl, aralkyl bearing on the aryl moiety one or more substituents selected from the group consisting of halogen, nitro, amino, hydroxy, lower alkyl, lower alkoxy, amino-lower alkyl, mono-lower alkylamino-lower alkyl, di-lower alkylamino-lower alkyl, trifluoromethyl, lower alkoxycarbonyl, lower acyl and lower alkanoylamido; and *n* signifies the value 0 or 1, and pharmaceutically acceptable acid addition salts and quaternary salts thereof. The compounds of Formula I are analgesics, antiphlogistics, antiallergics and anti-inflammatory agents.

The invention also relates to novel intermediates of the formula

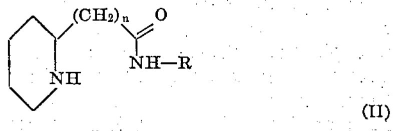

wherein R and *n* are as previously described.

DETAILED DESCRIPTION

In accordance with this invention, compounds of the formula

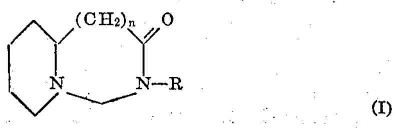

are prepared by reacting a compound of the formula

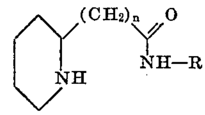

wherein R and *n* are as previously described, with formaldehyde. If desired, the substituent R can be modified and the base thus obtained can be converted into a pharmaceutically acceptable acid addition salt or into a pharmaceutically acceptable quaternary salt.

As used herein, the term "lower alkyl" denotes a straight or branched chain hydrocarbon of 1–7 carbon atoms, preferably of 1–4 carbon atoms, such as methyl, ethyl, propyl and isopropyl. The term "lower alkoxy" denotes lower alkyl ether groups in which the lower alkyl moiety is as described above. The term "aryl" denotes phenyl and naphthyl, preferably phenyl.

Preferred substituted aryl are: alkoxycarbonylphenyl such as, 2-methoxycarbonyl-phenyl; halophenyl, such as p-fluoro-phenyl and nitro- and halo-substituted phenyl, such as 3-nitro-4-chloro-phenyl and 2-nitro-4-chlorophenyl.

The term "aralkyl" denotes a straight or branched chain lower alkyl group in which one or more of the hydrogen atoms have been replaced by an aryl group. Benzyl and phenethyl are preferred. The term "lower acyl" denotes lower alkyl carbonyl groups in which lower alkyl is as described above. The term "lower alkanoyl" denotes an alkanoyl residue of a lower carboxylic acid of 1–7 carbon atoms. The term "halogen" is to be understood to include chlorine, bromine, iodine and fluorine. Chlorine, bromine and fluorine are preferred. The term "heterocyclic radical" denotes a 5- and 6-membered heterocyclic radical having one or more atoms of nitrogen, oxygen or sulfur. Examples of these are pyridyl, pyrimidyl, thienyl, thiazolyl, furyl and the like.

When *n* in the above Formula I signifies the value 0, the compounds are 2,3a-diazahydrindanone derivatives of the formula

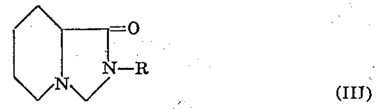

Examples of compounds of Formula III are:

2-(m-trifluoromethylphenyl)-2,3a-diazahydrindanone,
2-(3′,4′-dimethoxyphenyl)-2,3a-diazahydrindanone,
2-(p-methoxyphenyl)-2,3a-diazahydrindanone,
2-(o-methoxycarbonylphenyl)-2,3a-diazahydrindanone hydrochloride,
2-(p-hydroxyphenyl)-2,3a-diazahydrindanone,
2-(diethylaminoethyl)-2,3a-diazahydrindanone dihydrobromide,
2-(p-fluorophenyl)-2,3a-diazahydrindanone hydrochloride,
2-(p-chlorophenyl)-2,3a-diazahydrindanone,
2-(p-nitrophenyl)-2,3a-diazahydrindanone,
2-(m-nitrophenyl)-2,3a-diazahydrindanone hydrochloride, and the like.

When *n* in the above Formula I signifies the value 1, the compounds are 3H-pyrido-[1,2-c]pyrimidin-3-one derivatives of the formula

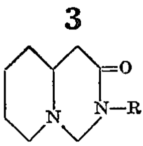

(IV)

Examples of compounds of Formula IV are:

Octahydro-2-(m-nitrophenyl)-3H-pyrido-[1,2-c] pyrimidin-3-one hydrochloride,
Octahydro-2-(p-ethoxyphenyl)-3H-pyrido-[1,2-c] pyrimidin-3-one hydrochloride,
Octahydro-2-(m-chlorophenyl)-3H-pyrido-[1,2-c] pyrimidin-3-one hydrochloride,
Octahydro-2-(benzyl)-3H-pyrido-[1,2-c]pyrimidin-3-one hydrochloride,
Octahydro-2-(3',4'-dichlorophenyl)-3H-pyrido-[1,2-c] pyrimidin-3-one hydrochloride,
Octahydro-2-(p-nitrophenyl)-3H-pyrido-[1,2-c] pyrimidin-3-one hydrochloride,
Octahydro-2-(o-nitrophenyl)-3H-pyrido-[1,2-c] pyrimidin-3-one hydrochloride,
Octahydro-2-(o-methoxycarbonyl-phenyl)-3H-pyrido-[1,2-c]pyrimidin-3-one hydrochloride,
Octahydro-2-(o-chlorophenyl)-3H-pyrido-[1,2-c] pyrimidin-3-one hydrochloride,
Octahydro-2-(3'-nitro-4'-chlorophenyl)-3H-pyrido-[1,2-c]pyrimidin-3-one,
Octahydro-2-(4'-chloro-3'-nitrophenyl)-3H-pyrido-[1,2-c]pyrimidin-3-one hydrochloride,
Octahydro-2-(2'-nitro-4'-chlorophenyl)-3H-pyrido-[1,2-c]pyrimidin-3-one hydrochloride,
Octahydro-2-(2',5'-dichlorophenyl)-3H-pyrido-[1,2-c] pyrimidin-3-one hydrochloride,
Octahydro-2-(p-fluorophenyl)-3H-pyrido-[1,2-c] pyrimidin-3-one,
Octahydro-2-(4-acetamido-phenyl)-3H-pyrido-[1,2-c] pyrimidin-3-one, and the like.

The starting materials of Formula II wherein $n$ signifies the value 0 are compounds of the formula

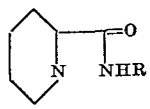

(V)

and can be prepared in accordance with the following reaction scheme:

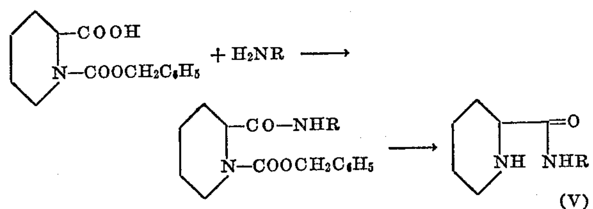

(V)

Examples of compounds of Formula V are:

α-pipecolinic acid m-trifluoromethyl anilide,
α-pipecolinic acid 3,4-dimethoxy anilide,
α-pipecolinic acid p-methoxy anilide,
α-pipecolinic acid o-methoxycarbonyl anilide,
α-pipecolinic acid p-hydroxy anilide,
α-pipecolinic acid diethylaminoethylamide,
α-pipecolinic acid p-fluoro anilide,
α-pipecolinic acid p-chloro anilide,
α-pipecolinic acid p-nitro anilide,
α-pipecolinic acid m-nitro anilide, and the like.

The starting materials of Formula II wherein $n$ signifies the value 1 are compounds of the formula

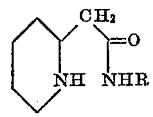

and can be prepared in accordance with the following reaction scheme:

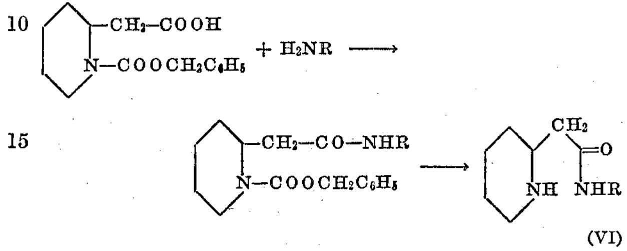

(VI)

Examples of compounds of Formula VI are:

2-(2-piperidyl)acetic acid m-nitroanilide,
2-(2-piperidyl)acetic acid p-ethoxyanilide,
2-(2-piperidyl)acetic acid m-chloroanilide,
2-(2-piperidyl)acetic acid benzylamide,
2-(2-piperidyl)acetic acid 3,4-dichloroanilide,
2-(2-piperidyl)acetic acid p-nitroanilide,
2-(2-piperidyl)acetic acid o-nitroanilide,
2-(2-piperidyl)acetic acid 2-methoxycarbonyl anilide,
2-(2-piperidyl)acetic acid o-chloroanilide,
2-(2-piperidyl)acetic acid 3-nitro-4-chloro anilide,
2-(2-piperidyl)acetic acid 2-nitro-4-chloro anilide,
2-(2-piperidyl)acetic acid 2,5-dichloroanilide,
2-(2-piperidyl)acetic acid p-fluoroanilide,
2-(2-piperidyl)acetic acid 4-acetamido anilide, and the like.

The manufacture of the starting materials is more precisely set forth in the examples.

The reaction of the starting materials of Formula II with formaldehyde is conveniently carried out using an aqueous formaldehyde solution and suspending therein the starting material. If desired, the reaction can also be carried out in the presence of an organic solvent, for example, a lower aliphatic alcohol such as methanol or ethanol. The reaction proceeds at room temperature. However, conveniently the reaction mixture is heated preferably at reflux temperatures. After cooling the reaction mixture and, if desired after concentration under reduced pressure, the product obtained can be isolated in the usual manner, as by filtration, and purified, as by crystallization.

If desired, the substituent R of a compound thus obtained can be modified in a further step of the process. Thus, for example, a nitroaryl substituent can be reduced to the corresponding aminoaryl substituent. Furthermore, an aminoalkyl group can be converted to a mono- or dialkylamino-alkyl group, or a hydroxyalkyl group to a haloalkyl group utilizing known procedures.

Finally, the bases obtained in accordance with the process of the invention can, if desired, be transformed into pharmaceutically acceptable acid addition salts or quaternary salts. Acid addition salts can be obtained by treatment of the bases with inorganic or organic acids, such as, hydrochloric acid, hydrobromic acid, sulfuric acid, phosphoric acid, acetic acid, citric acid, malic acid, tartaric acid and the like. Quaternary salts can be produced in the usual manner by treatment with alkyl halides, dialkyl sulfates and the like.

The compounds of Formula I are useful analgesics, antiphlogistics, antiallergics and anti-inflammatory agents.

For such uses, the compounds of Formula I are formulated, using conventional inert pharmaceutical adjuvant materials, into dosage forms which are suitable for oral or parenteral administration. Such dosage forms include tablets, suspensions, solutions, etc. Furthermore, the compounds of this invention can be embodied into, and administered in the form of, suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, polyalkylene glycols, and the like. Moreover, preservatives, stabilizers, wetting agents, emulsifying agents, salts for altering osmotic pressure, buffers, etc. can be incorporated, if desired, into such formulations.

The quantity of active medicament which is present in any of the above-described dosage forms is variable. It is preferred, however, to provide capsules or tablets containing from about 20 mg. to about 50 mg. of the Formula I base or an equivalent amount of a pharmaceutically acceptable acid addition salt or quaternary salt thereof. For parenteral administration, it is preferred to provide a solution containing from about 10 mg./ml. to about 20 mg./ml. of the Formula I base, or an equivalent quantity of pharmaceutically acceptable acid addition salt or quaternary salt thereof.

The frequency with which any such dosage form will be administered to a patient will vary, depending upon the quantity of active medicament present therein and the needs and requirements of the patient, is diagnosed by the prescribing practitioner. Under ordinary circumstances, however, up to about 2 mg./kg. of the compound can be administered daily in several doses. It is to be understood, however, that the dosages set forth therein are exemplary.

The invention will be better understood by reference to the following examples which are given for illustration purposes. Temperatures, unless otherwise stated, are expressed in degrees centigrade.

Example 1

22.5 g. of 2-(2-piperidyl)acetic acid m-nitroanilide are dissolved in a mixture of 20 ml. of methanol and 100 ml. of 38% aqueous formaldehyde solution. The resulting solution is boiled at reflux for 2 hours and then concentrated under reduced pressure to about half its original volume. After dilution with water, the reaction product is taken up in ether and washed with water. After evaporation of the ether, there remains a residue which is octahydro-2-(m-nitrophenyl) - 3H - pyrido-[1,2-c]pyrimidin-3-one, the hydrochloride of which, after recrystallization from alcohol/ether, melts at 237–238°.

The 2-(2-piperidyl)acetic acid m-nitroanilide used herein as starting material was prepared as follows:

27.7 g. of N-carbobenzoxy-2-(2-piperidyl)acetic acid were dissolved in 50 ml. of dioxane. The resulting solution was treated with a solution of 16.6 g. of m-nitroaniline in 50 ml. of dioxane. The mixture thus obtained was treated at room temperature with a solution of 24 g. of N,N'-dicyclohexyl-carbodiimide in 30 ml. of dioxane. After about 18 hours, the precipitated dicyclohexyl-urea was removed by filtration, the filtrate concentrated under reduced pressure and the residue taken up in ether. The ethereal solution was successively washed with dilute hydrochloric acid, water, dilute sodium carbonate solution, water, and dried over magnesium sulfate. The residue remaining behind after evaporation of the solvent under reduced pressure, was dissolved in glacial acetic and treated under ice-cooling with 120 ml. of 33% hydrobromic acid. After about 18 hours, the solution obtained was evaporated under reduced pressure and the residue that remained was taken up in water and ether. The aqueous phase, which contained the desired reaction product in salt form, was once more extracted with ether and the ether extract was discarded. After the addition of concentrated ammonia to the aqueous solution, 2-(2-piperidyl)acetic acid m-nitroanilide separated and was taken up in methylene chloride and washed with water. The base remaining behind after the solvent was removed by distillation, yielded the corresponding hydrochloride having a melting point of 252–253°:

Following the procedure of Example 1, but substituting for the m-nitro-aniline p-ethoxy-aniline,
m-chloro-aniline,
benzylamine,
3,4-dichloro-aniline,
p-nitro-aniline,
o-nitroaniline,
2-methoxycarbonyl-aniline,
o-chloro-aniline,
3-nitro-4-chloro-aniline,
2-nitro-4-chloro-aniline,
2,5-dichloro-aniline,
p-fluoro-aniline, or
4-acetamido-aniline there are obtained starting materials of the formula

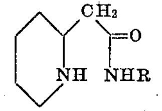

(VI)

and end products of the formula

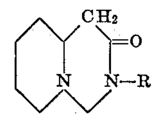

(IV)

respectively set forth in Table 1.

TABLE I

| R | Starting material M.P., salt or base | End product M.P., salt or base |
|---|---|---|
| $-OC_2H_5$ | Base/125° | Base/103–4°, HCl/197–199°. |
| Cl | Base/oil | HCl/190–191°. |
| $-CH_2-$ | Base/crystalline | HCl/180–181°. |
| Cl, —Cl | Base/105–6° | HCl/210–220°. |
| $-NO_2$ | HCl/262–263° | HCl/228–229°. |
| $NO_2$ | HCl/222–223° | HCl/223–224°. |
| $COOCH_3$ | HCl/173–4° | HCl/193–194°. |
| Cl | HBr/217–218° | HCl/234–5°. |
| —Cl, $NO_2$ | Base/100°, HBr/228 | Base/138°, HCl/219–220°. |

TABLE I—Continued

| R | Starting material M.P., salt or base | End product M.P., salt or base |
|---|---|---|
| —[ring]—Cl, with $NO_2$ | HBr crude/217–218° | HCl/209–210°. |
| —[ring], with Cl and Cl | HBr/219–220° | HCl/227–228°. |
| —[ring]—F | HCl/212–3° | HCl/219–220°. |
| —[ring]—$NHCOCH_3$ | Base/205–6° | HCl/231–2°. |

Example 2

16 g. of α-pipercolinic acid m-trifluoromethyl-anilide are refluxed for 2 hours with 160 ml. of 28% formaldehyde and 2 ml. of ethanol. Upon cooling of the reaction mixture, 2-(m-trifluoromethyl-phenyl)-2,3a-diazahydrindanone of melting point 145–146° precipitates.

The pipecolinic m-trifluoromethyl-anilide used herein as the starting material was prepared as follows:

A solution of 21 g. of N,N'-dicyclohexyl-carbodiimide in 50 ml. of dioxane was successively treated with 16 g. of m-trifluoromethyl-aniline and a solution of 26 g. of N-carbobenzoxy-α-pipecolinic acid in 50 ml. of dioxan. The reaction mixture was allowed to stand overnight, the precipitated N,N'-dicyclohexylurea was removed by filtration and the filtrate was evaporated under reduced pressure. The residue was dissolved in ether. The ethereal solution was successively washed with dilute hydrochloric acid, water, dilute sodium carbonate solution and again with water. After evaporation of the ether, the residue was dissolved in 50 ml. of 33% hydrobromic acid and α-pipecolinic acid m-trifluoromethyl-anilide hydrobromide of melting point 260° C. crystallized out. The free base obtained from this hydrobromide in the usual manner melts at 205°.

Following the procedure of Example 2, but substituting for the m-trifluoromethyl-aniline 3,4-dimethoxy-aniline,
p-methoxy-aniline,
o-methoxycarbonyl-aniline,
p-hydroxy-aniline,
diethylaminoethylamine,
p-fluoro-aniline,
p-chloro-aniline,
p-nitro-aniline,
m-nitro-aniline there are obtained starting materials of the formula

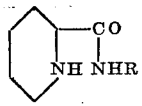

(V)

and end products of the formula

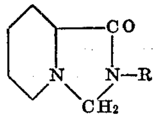

(III)

respectively set forth in Table II.

TABLE II

| R | Starting material M.P., salt or base | End product M.P., salt or base |
|---|---|---|
| —[ring]—$OCH_3$, with $OCH_3$ | Base/78° | Base/172° HCl/215–216°. |
| —[ring]—$OCH_3$ | Base/113–114° | HCl/126°. |
| —[ring], with $COOCH_3$ | Base/oil | HBr/200°. |
| —[ring]—OH | Base/230° | Base/168–170° HCl/232–233°. |
| $—CH_2—CH_2—N(C_2H_5)_2$ | Base/oil | 2HBr/178°. |
| —[ring]—F | HBr/263–4° | HCl/202–203°. |
| —[ring]—Cl | HBr/285° | Base/131–132°, HCl/179–180°. |
| —[ring]—$NO_2$ | Base/103–105° | Base/141–142°, HCl/200°. |
| —[ring], with $NO_2$ | HCl/251–252° | HCl/189–190°. |

Example 3

Tablets can be prepared in a known manner utilizing the following formulation:

| | Mg. |
|---|---|
| Octahydro-2-(2'-nitro-4-chloro-phenyl)-3H-pyrido[1,2-c]pyrimidin-3-one-hydrochloride | 25 |
| Milk sugar | 70 |
| Corn starch | 43 |
| Magnesium stearate | 0.30 |
| Talc | 2.70 |
| Total | 150.00 |

I claim.

1. A compound of the formula

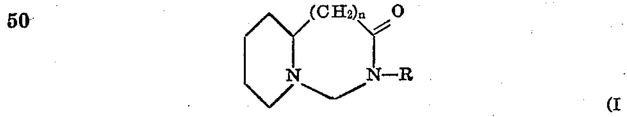

(I wherein R is benxyl; lower alkyl of 1–7 carbon atoms bearing a dilower alkylamino of 1–7 carbon atoms; phenyl; or phenyl bearing 1 to 2 substituents selected from the group consisting of halogen, nitro, amino, lower alkoxy of 1–7 carbon atoms, trifluoromethyl, hydoxy, lower alkoxy-carbonyl wherein lower alkoxy is of 1–7 carbon atoms, and lower alkanoylimido wherein alkanoyl is of 1–7 carbon atoms; and $n$ signifies the value 0 or 1, and pharmaceutically acceptable acid addition and quaternary salts thereof.

2. A compound in accordance with claim 1 wherein $n$ is 1.

3. A compound in accordance with claim 1 wherein $n$ is 0.

4. A compound in accordance with claim 2 wherein R is phenyl bearing one to two substituents selected from the group consisting of halogen, nitro, amino, hydroxy, lower alkoxy of 1–7 carbon atoms, trifluoromethyl, lower alkoxy carbonyl wherein lower alkoxy is of 1–7 carbon atoms, and lower alkanoylimido wherein alkanoyl is of 1–7 carbon atoms.

5. A compound in accordance with claim 2 wherein R is benzyl.

6. A compound in accordance with claim 2 selected from the group consisting of octahydro-2-(2'-nitro-4'-chlorophenyl) - 3H - pyrido-[1,2-c]pyrimidin-3-one and pharmaceutically acceptable acid addition salts thereof.

7. A compound in accordance with claim 6, octahydro-2-(2' - nitro - 4' - chlorophenyl) - 3H - pyrido - [1,2-c]pyrimidin-3-one.

8. A compound in accordance with claim 2 selected from the group consisting of octahydro-2-(3'-nitro-4'-chlorophenyl) - 3H - pyrido - [1,2-c]pyrimidin-3-one and pharmaceutically acceptable acid addition salts thereof.

9. A compound in accordance with claim 8, octahydro-2 - (3' - nitro - 4' - chlorophenyl) - 3H - pyrido - [1,2-c]pyrimidin-3-one.

10. A compound in accordance with claim 2 selected from the group consisting of octahydro-2-(m-nitrophenyl)-3H-pyrido-[1,2-c-]pyrimidin-3-one and pharmaceutically acceptable acid addition salts thereof.

11. A compound in accordance with claim 10, octahydro-2-(m-nitrophenyl) - 3H - pyrido - [1,2-c]pyrimidin-3-one.

12. A compound in accordance with claim 2 selected from the group consisting of octahydro-2-(3',4'-dichlorophenyl) - 3H - pyrido - [1,2-c-]pyrimidin-3-one and pharmaceutically acceptable acid addition salts thereof.

13. A compound in accordance with claim 12, octahydro-2-(3',4' - dichlorophenyl) - 3H - pyrido - [1,2-c]pyrimidin-3-one.

14. A compound in accordance with claim 2 selected from the group consisting of octahydro-2-(p-nitrophenyl)-3H - pyrido - [1,2-c]pyrimidin-3-one and pharmaceutically acceptable acid addition salts thereof.

15. A compound in accordance with claim 14, octahydro-2-(p-nitrophenyl) - 3H - pyrido - [1,2-c]pyrimidin-3-one.

16. A compound in accordance with claim 3 wherein R is phenyl bearing one to two substituents selected from the group consisting of halogen, nitro, amino, hydroxy, lower alkoxy of 1–7 carbon atoms, trifluoromethyl, lower alkoxycarbonyl wherein lower alkoxy is of 1–7 carbon atoms, and lower alkanoylimido wherein alkanoyl is of 1–7 carbon atoms.

17. A compound in accordance with claim 3 selected from the group consisting of 2-(o-methoxycarbonylphenyl)-2,3a-diazahydrindanone and pharmaceutically acceptable acid addition salts thereof.

18. A compound in accordance with claim 17, 2-(o-methoxy-carbonylphenyl)-2,3a-diazahydrindanone.

19. A compound in accordance with claim 3 selected from the group consisting of 2-(p-fluorophenyl)-2,3a-diazahydrindanone and pharmaceutically acceptable acid addition salts thereof.

20. A compound in accordance with claim 19, 2-(p-fluorophenyl)-2,3a-diazahydrindanone.

21. A compound in accordance with claim 3 selected from the group consisting of 2-(p-nitrophenyl)-2,3a-diazahydrindanone and pharmaceutically acceptable acid addition salts thereof.

22. A compound in accordance with claim 21, 2-(p-nitrophenyl)-2,3a-diazahydrindanone.

References Cited

Winterfeld et al., Chem. Ber. 92, 637–44 (1959).

ALEX MAZEL, Primary Examiner

R. V. RUSH, Assistant Examiner

U.S. Cl. X.R.

260—256.4, 294, 256.5; 424—251, 267

PO-1050
(5/69)

UNITED STATES PATENT OFFICE
CERTIFICATE OF CORRECTION

Patent No. 3,515,725 Dated June 2, 1970

Inventor(s) Joseph Hellerbach

It is certified that error appears in the above-identified patent and that said Letters Patent are hereby corrected as shown below:

Column 8, line 55, claim 1

"benxyl" should be benzyl

SIGNED AND SEALED DEC 8-1970

(SEAL)
Attest:

Edward M. Fletcher, Jr.
Attesting Officer

WILLIAM E. SCHUYLER, JR.
Commissioner of Patents